Jan. 14, 1964 R. R. MATTHEWS 3,117,610
NUT ANCHOR
Filed April 6, 1960
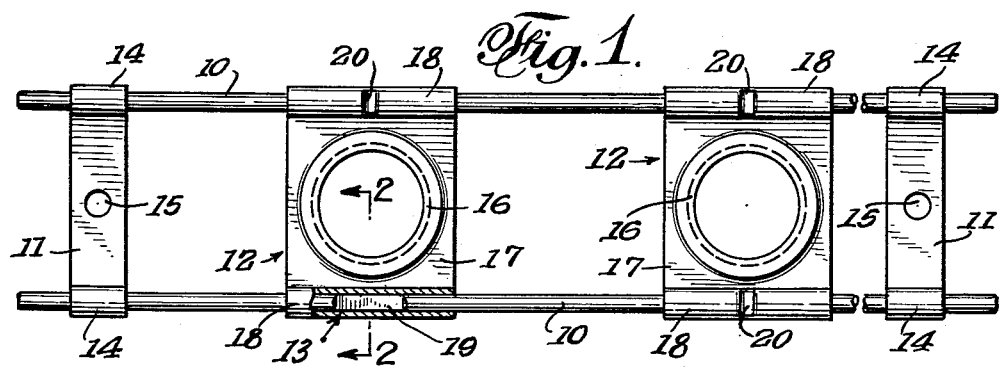
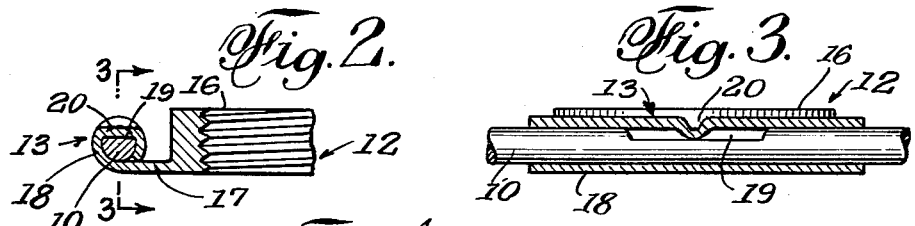
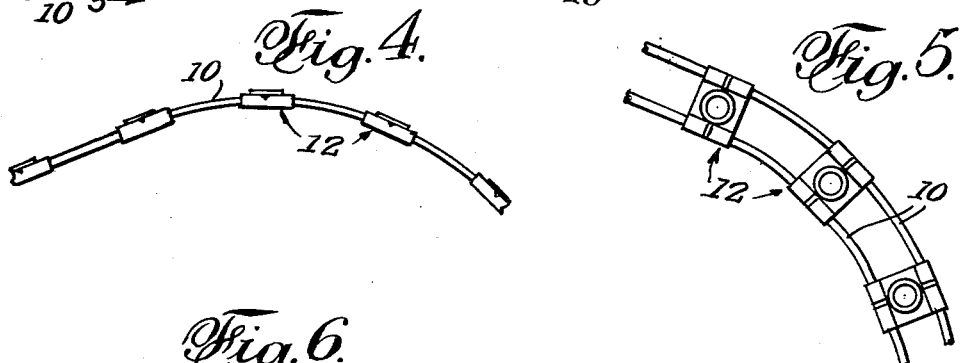
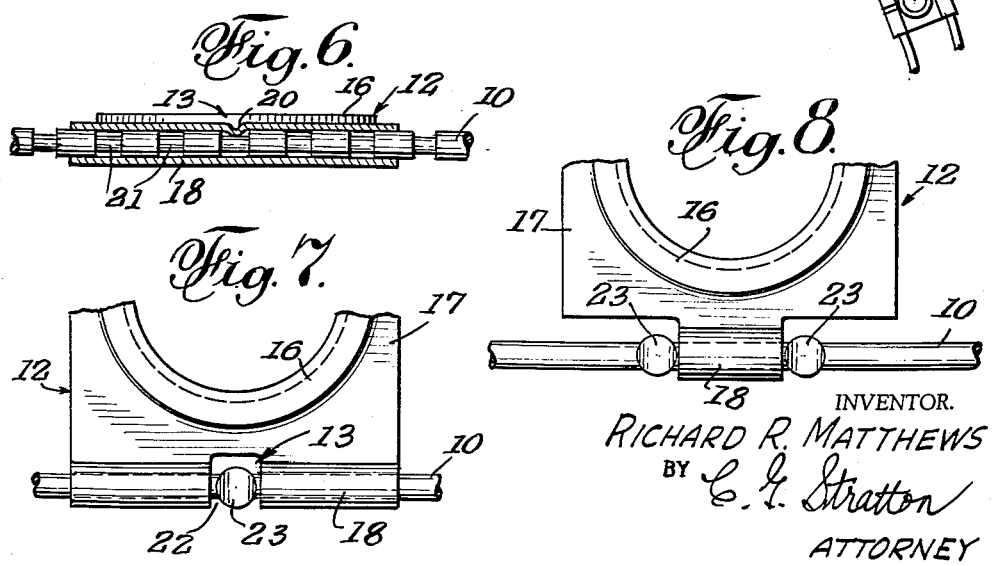
INVENTOR.
RICHARD R. MATTHEWS
BY C. G. Stratton
ATTORNEY United States Patent Office 3,117,610
Patented Jan. 14, 1964

3,117,610
NUT ANCHOR
Richard R. Matthews, Pico Rivera, Calif.
(7950 Alameda St., Huntington Park, Calif.)
Filed Apr. 6, 1960, Ser. No. 20,411
2 Claims. (Cl. 151—41.71)

This invention relates to a nut anchor, the same generally comprising a plurality of nuts in a gang and used in places where said nuts cannot conveniently be reached and held against rotation when engaged by screws to fasten two parts together. While there are other fields of use, the present nut anchor is primarily adapted for fastening parts together in aircraft.

It is common to connect such nuts by means of an elongated channel member. Thus, the nut anchor or connector may not be readily bent or otherwise trained over a curved place or around a corner, it being the nature of a channel member to buckle and so distort when so bent that the nuts anchored thereto are thrown out of the desired planes. Therefore, the nuts become so misaligned that screws either do not find them in proper registration or if the screws do enter the nuts, the threads of the latter are canted so that nut and screw jamming occurs with the result that the screws cannot be fully set in. Such channel connectors can more readily be bent in one plane than in the other. In fact, in one of the planes, the web of the channel strongly resists being bent which can be accomplished only by nut-displacing buckling.

There are other nut anchoring members besides those formed as channels. These also have webs or comprise plates with nut-connecting means thereon. Such webs and plates have the same faults, when being bent, as do the webs of the channel anchor members.

Recognizing the above faults in nut anchors, this invention has for an object to provide a nut anchor that can be universally bent, i.e., in both planes and in such manner that the axes of the threads of the nuts are not displaced from their proper screw-receiving positions.

Another object of the invention is to provide a nut anchor in which only the opposite edges of the nuts are engaged by the anchor means and the opposite sides of the latter means are both unconnected between nuts and free to flex independently to enable retention of the proper operative positions of the nuts regardless of the bends and directions thereof in the anchor.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes preferred embodiments of the present invention which are given by way of illustration or example only.

In the drawing, like reference characters designate similar parts in the several views.

FIG. 1 is a broken plan view of a nut anchor according to the present invention and showing a preferred connection between the anchor and the nuts.

FIG. 2 is an enlarged cross-sectional view as taken on the line 2—2 of FIG. 1.

FIG. 3 is an enlarged longitudinal view as taken on the line 3—3 of FIG. 2.

FIG. 4, to a reduced scale, is an edge view of the present nut anchor as bent in a plane that is normal to the plane of the nuts thereof.

FIG. 5 is a plan view, to the same scale, showing the nut anchor bent in the plane of the nuts thereof.

FIG. 6 is a modification, similar to the showing of FIG. 3, of means to connect a nut to the anchor of the present invention.

FIGS. 7 and 8 are broken plan views of two additional modifications.

The present nut anchor comprises generally, a pair of longitudinal, transversely spaced parallel rod members 10, a transverse connector 11 at each end of said members, a set of nuts 12 spanning between the members 10 between the connectors 11, and means 13 to loosely connect the nuts to the members 10.

The members 10 are preferably made of rod stock of preferably round cross section. The same, for the purpose of the present invention, are capable of being bent and retain their bent condition enabling the frame, that is comprised of said members 10 and the connectors 11, to be bent in the plane in which the rod members 10 reside, on a curve or bend in which both members are bent equally, i.e., in a plane transverse to the first mentioned plane, or in both said planes, as desired.

The connectors 11 lend unity to the anchor and provide a means for fastening the same to a support. To this end, the anchors are formed of flat members provided with eyes 14 that tightly wrap around the rod members 10, or otherwise fastened to said members. A hole or holes 15 in the connectors accommodate fasteners.

The nuts 12 are alike. In this case, each is shown with an internally threaded collar 16 provided on a base plate 17 that has oppositely provided eyes 18 loosely engaged with the rod members 10. Regardless how otherwise formed, the loose connection with the rod members 10 and the fact that said plate 17, or its equivalent, spans across the space between said members, are the essential features of the nuts 12 insofar as this invention is concerned. It will be evident that the nuts 12, although loosely connected to the rod members, nevertheless, serve as the only means that span between said members and keep the interemdiate portion of the latter from inadvertent separation and movement together. Also, the rod members may be bent either as in FIG. 4, or in FIG. 5, as explained above, the nuts 12 retaining the rod spacing except for the variations in bending conformation.

The looseness provided between the nuts and the rod members enables a screw end to find the threads of collar 16 even though the present nut anchor is in a hidden and hard-to-hold position.

The means 13 serves to limit the shift of the nuts along the rod members. In FIGS. 1, 2 and 3, said means is shown as an elongated flat 19 in each rod 10 for each nut 12, and a depressed or offset portion or key 20 formed in each eye 18 and having sliding engagement along the flats 19. In this manner, the shifted positions of the nuts are limited to the length of the flats, as can be seen from said figures.

In FIG. 6, the rod members 10 are shown as having a series of annular grooves 21, the same, selectively, being engaged by key 20. Thus, the nuts 12 may be either uniformly spaced along the members 10 or spaced differently, as desired.

The modification of FIG. 7 varies the keying connection between the nuts and the rod members by providing an eye-interrupting space 22 in the eyes 18 and deforming the rod members 10 to provide enlargements 23 that are disposed in said space that limit endwise shift of the nuts.

The variation of FIG. 8 is much the same. In this case, the eye 18 is reduced in length and the rods 10 are provided with enlargements 23 on both ends of the eyes. Of course, the eyes 18 can be the same length as before.

The modifications are intended as exemplary, each providing a means for limiting the shift of the nuts 12 along the rod members 10, as desired.

While I have illustrated an described what I now contemplate to be the best mode of carrying out my invention, the constructions are, of course, subject to modification without departing from the spirit and scope of my invention. Therefore, I do not wish to restrict myself to the particular forms of construction illustrated and described, but desire to avail myself of all modifications that may fall within the scope of the appended claims.

Having thus described my invention, what I claim and desire to secure by Letters Patent is:

1. A nut anchor comprising two parallel and transversely spaced elongated and form-retaining bendable rods, a set of longitudinally spaced nuts along said rods and each including a spanning portion between the rods, said spanning portion providing inter-connected means on each nut and on the elongated rods to directly and loosely connect the nuts and the rods, whereby the nuts are longitudinally movable along the rods relatively to each other, means to limit longitudinal movement of each of the loosely connected nuts along the rods, the inter-connected means comprising a laterally extending base terminating in eye portions on the opposite side edges of each nut which surrounds and loosely engages with said rods, and the means to limit longitudinal movement of each nut comprising at least one deformed portion of each rod which provides an enlargement at each end of said eye, said enlargements being spaced from said eye portions whereby they are in loose abutment association with each eye portion of the nut.

2. A nut anchor comprising two parallel and transversely spaced elongated and form-retaining bendable rods, a set of longitudinally spaced nuts along said rods and each including a spanning portion between the rods, said spanning portion providing inter-connected means on each nut and on the elongated rods to directly and loosely connect the nuts and the rods, whereby the nuts are longitudinally moveable along the rods relatively to each other, means to limit longitudinal movement of each of the loosely connected nuts along the rods, the inter-connected means comprising a laterally extending base terminating in eye portions on the opposite side edges of each nut which surrounds and loosely engages with said rods, and the means to limit longitudinal movement of each nut comprising abutment means extending inwardly in an intermediate portion of each eye portion of each nut and abutment means provided by a recess in each portion of each rod that is surrounded by said eye portions, the abutment means in the eye portions being in loose abutment association with the respective abutment means of the rods.

References Cited in the file of this patent

UNITED STATES PATENTS

| | | |
|---|---|---|
| 1,004,226 | Ahern | Sept. 26, 1911 |
| 1,948,093 | Baird et al. | Feb. 20, 1934 |
| 2,374,548 | Leisure | Apr. 24, 1945 |
| 2,496,770 | Bennett | Feb. 7, 1950 |
| 2,542,375 | Torresen | Feb. 20, 1951 |
| 2,705,991 | Reiner | Apr. 12, 1955 |
| 2,772,560 | Neptune | Dec. 4, 1956 |
| 2,861,618 | Tinnerman | Nov. 25, 1958 |
| 2,879,569 | Poupitch | Mar. 31, 1959 |